(12) United States Patent
Kiekhaefer

(10) Patent No.: US 6,510,993 B1
(45) Date of Patent: Jan. 28, 2003

(54) AUTOMATED EDGE PROCESSING OF FINANCIAL TRANSACTION CARDS

(75) Inventor: John H. Kiekhaefer, Bloomingdale, IL (US)

(73) Assignee: Perfect Plastic Printing Corporation, St. Charles, IL (US)

( * ) Notice: Subject to any disclaimer, the term of this patent is extended or adjusted under 35 U.S.C. 154(b) by 0 days.

(21) Appl. No.: 09/699,857

(22) Filed: Oct. 30, 2000

(51) Int. Cl.[7] .................................................. G06K 7/06
(52) U.S. Cl. ........................ 235/439; 235/379; 235/380; 235/440; 283/7
(58) Field of Search ................................. 235/439, 440, 235/379, 380; 283/7

(56) References Cited

U.S. PATENT DOCUMENTS

| | | | | |
|---|---|---|---|---|
| 3,725,647 A | * | 4/1973 | Retzky | 235/487 |
| 3,775,594 A | * | 11/1973 | Pasieka et al. | 235/61.11 E |
| 3,818,189 A | * | 6/1974 | Stone et al. | 235/61.11 R |
| 4,223,918 A | * | 9/1980 | Smoczynski | 283/7 |
| 4,298,217 A | * | 11/1981 | Moraw et al. | 283/7 |
| 5,434,405 A | * | 7/1995 | Finkelstein et al. | |
| 5,877,941 A | * | 3/1999 | Ryu | 235/468 X |

FOREIGN PATENT DOCUMENTS

JP  406294607 A  * 10/1994

* cited by examiner

Primary Examiner—Karl D. Frech
Assistant Examiner—Daniel Walsh
(74) Attorney, Agent, or Firm—Walter W. Duft

(57) ABSTRACT

A method and a product produced by such method wherein improvement is made in the readability of a financial transaction card having poor edge contrast by an automated card processing system equipped with a card edge scanner. An edge of the card to be scanned by the edge scanner is first selected. A core section, a front overlay section, and a rear overlay section of the selected card edge are then identified. A contrast enhancer is provided on the core section between the front and rear overlay sections. The contrast enhancer is formed such that it contrasts well with the front and rear overlay sections to render the card processible by the processing system.

31 Claims, 3 Drawing Sheets

AUTOMATED EDGE PROCESSING OF FINANCIAL TRANSACTION CARDS

CROSS-REFERENCE TO RELATED APPLICATIONS

None

BACKGROUND OF THE INVENTION

1. Field of the Invention

The invention generally relates to financial transaction cards, including credit cards, debit cards, ATM (Automated Teller Machine) cards, and the like. More specifically, the invention relates to the processing of financial transaction cards using automated card processing systems, such as counters, sorters, etc. Still more particularly, the invention concerns the processing of financial transaction cards using automated edge scanning techniques.

2. Description of the Prior Art

By way of background, automated card processing systems are used to process (e.g., count, sort, etc.) large numbers of financial transaction cards, thus saving the time and expense required to process such cards by non-automated methods. One use of equipment of this type is to determine the number of individual cards present in a given set or batch of cards. For example, financial transaction card manufacturers need to be able to automatically count the number of cards produced during a production run of cards for a particular customer or for a particular card type. By way of further example, financial transaction card customers, such as banks, typically count their cards on a regular basis (e.g., daily) for security reasons.

In conventional card processing systems of the card counting type, finished cards are placed in a stack and a scanner visually scans the edges of the cards. Such a card stack is shown by way of example in FIG. 1, with the card edges being disproportionately enlarged for clarity and ease of explanation. Individual cards can be identified by the scanner because there is a visual (light/dark) contrast between a card edge's white plastic core section (comprising one or more core sheets) and the darker areas that appear above and below each core section. These darker appearing areas are due to the thin surface overlays that are present on the front and back of each card (front overlays and rear overlays, respectively), and the spaces that exist between cards (inter-card spaces) when the card stack is formed. A typical automated card counting apparatus of the foregoing type would be one of the 640 Series Stak-Kounter machines made by Spartanics, Inc. of Rolling Meadows, Ill.

Applicant has previously proposed financial transaction cards that are transparent or translucent when viewed on their planar faces. Examples of such cards are disclosed in copending application serial Nos. 09/411,359, 09/449,251, and 09/675,912. Insofar as these cards are made from transparent or translucent sheet stock material, the cards do not appear to have crisp white core sections when viewed on-edge. These non-white core sections do not contrast well with the front and rear overlays of the cards, and this lack of contrast makes it difficult for such cards to be accurately counted by conventional automated card counting systems. For example, in some card embodiments of the above-referenced applications, a two-sheet core section is used that comprises a front core sheet and a rear core sheet. Although the rear core sheet appears somewhat light, the front core sheet appears dark when viewed on-edge due to the front graphics and the way the cards are cut by production cutting shears. The required contrast between the core section and the front and rear overlays is thus lacking. In other types of transparent/translucent cards, the core section of the card may actually be slightly darker than the card's front and rear overlay sections.

An additional deficiency of automated card processing schemes using conventional edge scanning is that there is no way for the processing equipment to distinguish between cards from different production runs, or cards produced for different customers. Manufacturers typically rely on human operators to ensure that edge-scan processing of one batch of cards has completed before edge-scan processing of another card batch begins. In this scenario, it is possible for the operator to make a mistake and for cards from different batches to be intermixed prior to edge scanning.

Accordingly, a need exists for a solution to the problem of processing financial transaction cards using conventional automated card processing systems, such as card counters. This problem is particularly acute in the case of transparent/translucent financial cards, which lack the edge contrast that automated card counters need in order to accurately differentiate between cards. What is required is a methodology by which financial transaction cards can be reliably processed, without undue cost and preferably without modification of existing processing equipment.

SUMMARY OF THE INVENTION

A solution to the foregoing problem is provided, and an advance in the art is achieved, by a method for improving the readability of a financial transaction card having poor edge contrast by an automated card processing system equipped with a card edge scanner. According to the method, an edge of a card to be scanned by the edge scanner is selected. A core section, a front overlay section, and a rear overlay section of the selected card edge are identified. A contrast enhancer is provided on the core section between the front overlay and rear overlay sections. The contrast enhancer is formed such that it contrasts well with the front overlay and rear overlay sections to render the card processible by the processing system. A financial transaction card that has been configured with the aforementioned contrast enhancer is also disclosed.

The foregoing and other features and advantages of the invention will be apparent from the following more particular description of preferred embodiments of the invention, as illustrated in the accompanying drawings.

DETAILED DESCRIPTION OF PREFERRED EMBODIMENTS

Figure 1:
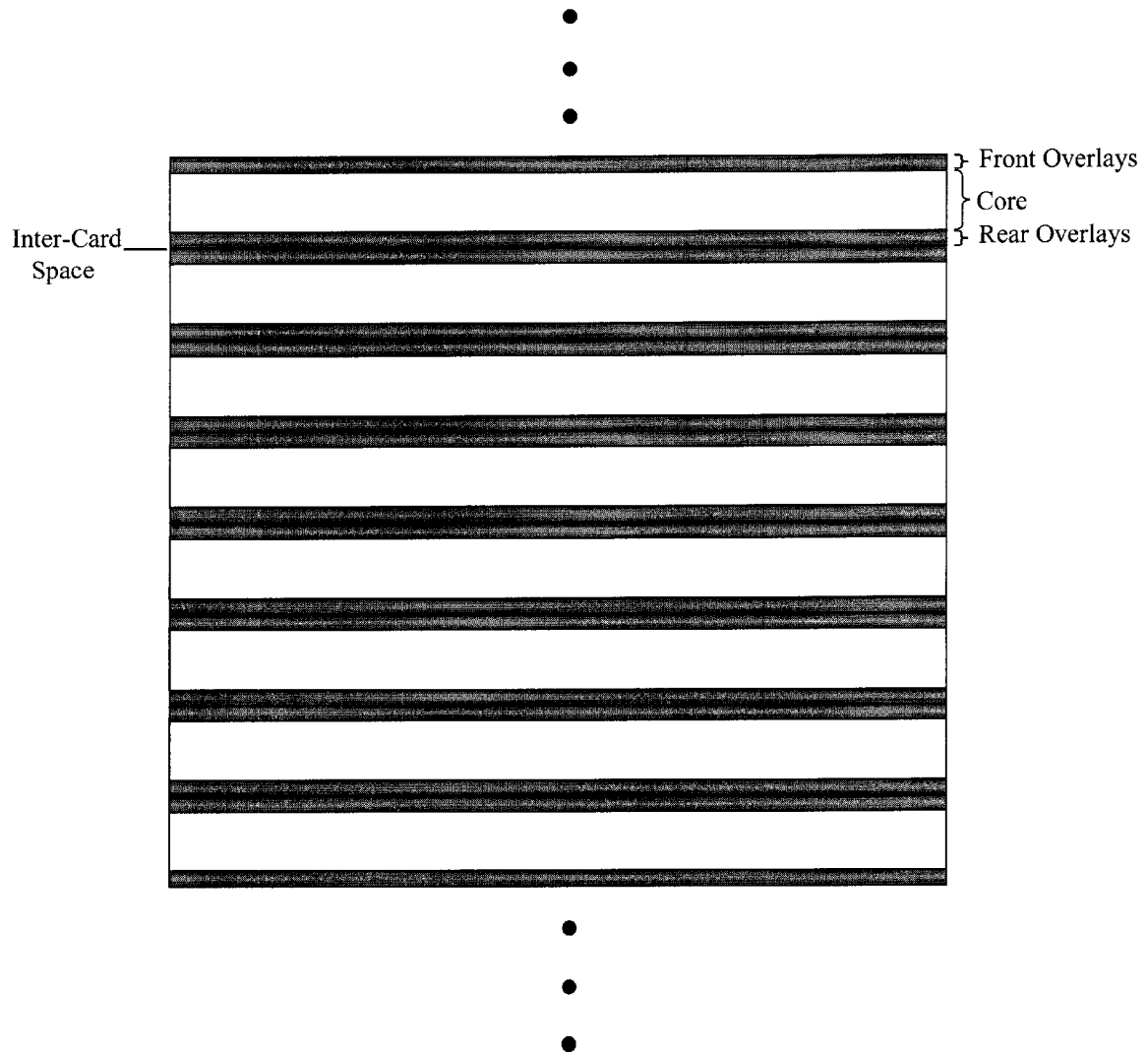
FIG. 1 is an end view of a stack of conventional financial transaction cards which is ready for edge scanning by card processing equipment.
Figure 2:
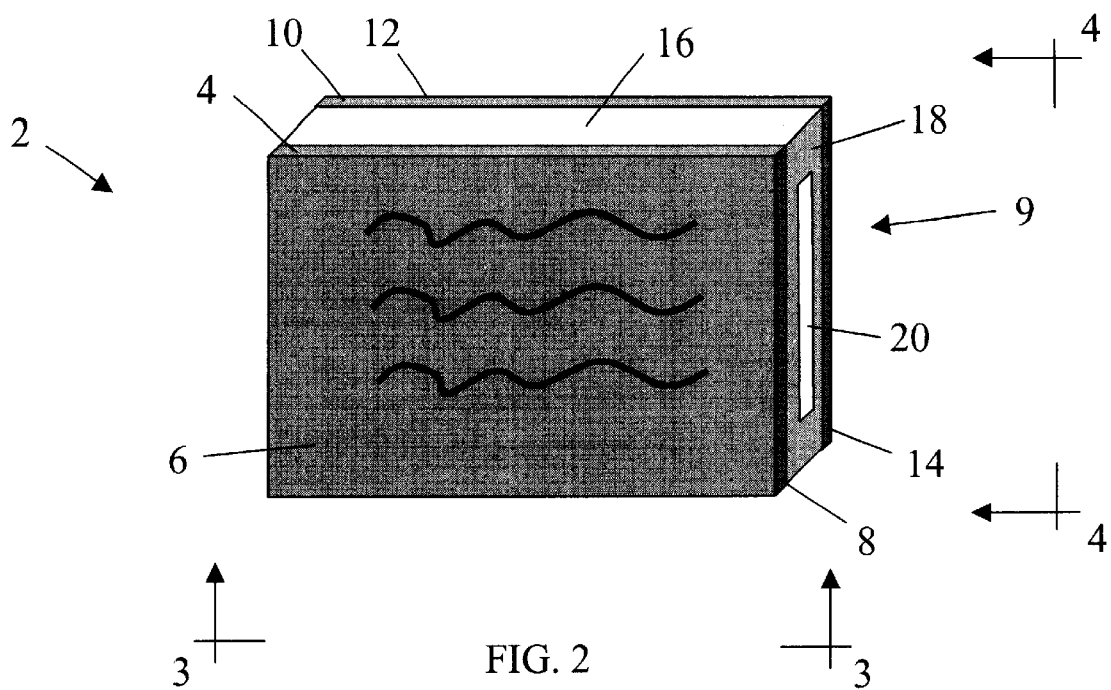
FIG. 2 is a perspective view of a transparent/translucent financial transaction card constructed in accordance with the invention.

Turning now to the figures wherein like reference numerals indicate like elements in all of the several views, FIG. 2 shows a financial transaction card 2 adapted for improved readability by an automated card processing system equipped with a card edge scanner (not shown). In particular, the processing system is assumed to be of the type described by way of background above wherein the card edge scanner relies on the light/dark contrast between a card's core section and the front overlay and rear overlay sections thereof (together with inter-card spaces) to differentiate between cards.

The card 2 includes a front overlay portion 4 that comprises one or more layers or coatings and which defines a generally planar front surface 6 of the card. The front overlay portion 4 has a continuous periphery that includes a section 8 of a scannable edge of the card 2. In FIG. 2, this is the right-hand edge of the card 2, as denominated by reference numeral 9. The section 8 will hereinafter be referred to as the "front overlay section" of the scannable edge 9.

The card 2 further includes a rear overlay portion 10 that comprises one or more layers or coatings and defines a generally planar rear surface 12 of the card 2. The rear overlay portion 10 has a continuous periphery that includes a section 14 of the scannable edge 9 of the card 2. The section 14 will hereinafter be referred to as the "rear overlay section" of the scannable edge 9.

The card 2 additionally includes a central core 16 that comprises one or more material sheets disposed between the front overlay portion 4 and the rear overlay portion 10. The central core 16 has a continuous periphery that includes a section 18 of the scannable edge 9 of the card 2. The section 18 will hereinafter be referred to as the "core section" of the scannable edge 9.

A contrast enhancer 20 is provided at a suitable location on the core section 18 of the scannable edge 9, between the front overlay section 8 and the rear overlay section 14. The contrast enhancer 20 is designed to provide an area on the core section 18 that has sufficient contrast relative to the front overlay section 8 and the rear overlay section 14 to render the card 2 processible by the above-described card processing equipment. To that end, the contrast enhancer 20 is preferably light in appearance relative to the front overlay section 8 and the rear overlay section 14. Most preferably, the contrast enhancer 20 is made from a material that provides an opaque white color. An example of an opaque white material that can be used to provide the contrast enhancer 20 is subsequently described. Notwithstanding the foregoing, and so as not to limit the scope of the invention to any particular material or class of materials, it should be understood that the contrast enhancer 20 could be made from any suitable contrast enhancing material, perhaps even materials that are colorless to human viewing, such as fluorescent materials, ultraviolet materials, magnetic materials, etc, so long as the card processing equipment is setup to detect such material.

Figure 3A:
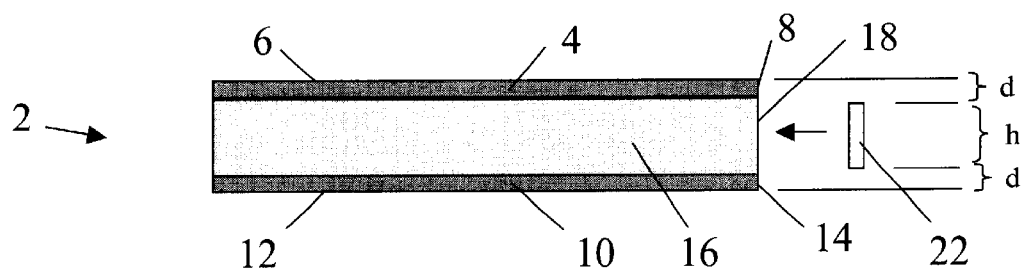
FIG. 3A is a side view taken in the direction of arrows 3—3 in FIG. 2 showing the application of a contrast enhancing marking to the financial transaction card of FIG. 2 when a single core sheet is used.

Turning now to FIG. 3A, the contrast enhancer 20 can be provided by applying a marking 22 on the core section 18. The marking 22 can be formed using ink jet printing (see below) or any other suitable method. In FIG. 3A, the core 16 is assumed to consist of a single core sheet only. In this configuration, the marking 22 can be positioned equidistantly between the front overlay section 8 and the rear overlay section 14. The marking 22 is preferably spaced from the front surface 6 and the rear surface 12 of the card 2 by a distance "d" that is at least the thickness of the front overlay section 8 and the rear overlay section 14, respectively. This would render the top-to-bottom height "h" of the marking 22 equal to the thickness of the core section 18. The height "h" of the marking 22 could also be less than the thickness of the core section 18. In practice, the marking 22 may range from a very small height, which may be the minimum required for edge scanner detection, to the full height of the core section 18. If the card 2 is a typical financial transaction card having the usual thickness of between about 27–33 mils, a core thickness of between about 23–30 mils, and front and rear overlay thickness of between about 1.5–2 mils, respectively, there should be a "d" spacing of at least about 1.5–2 mils between the marking 22 and the card's respective front and rear surfaces 6 and 12. The marking 22 itself may have a top-to-bottom height "h" within a range of about 5–30 mils. This translates to an "h" value of between about 17%–100% of the total core thickness.

Figure 3B:
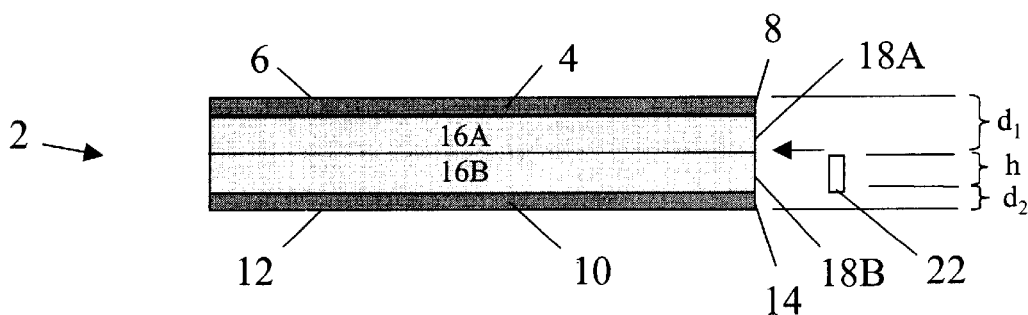
FIG. 3B is a side view taken in the direction of arrows 3—3 in FIG. 2 showing the application of a contrast enhancing marking to the financial transaction card of FIG. 2 when two core sheets are used.

FIG. 3B shows an alternative configuration that can be used when the card 2 has a two-sheet core 16 consisting of a front core sheet 16A and a rear core sheet 16B. The core sheets 16A and 16B respectively provide front and rear core sections 18A and 18B of the scannable edge 9. As described by way of background above, in some transparent/translucent financial transaction cards made in accordance with Applicant's copending applications, the front core section 18A will have a dark appearance as a result of the front graphics and the way the card is cut by production cutting shears. It thus has very little contrast relative to the front overlay section 8 and will be perceived by a card edge scanner in combination with the front overlay section as one dark section. On the other hand, the rear core section 18B will have a lighter appearance. It thus has less contrast relative to the rear overlay section 8 than the front core section 18A has to the front overlay section 14. To provide the required contrast needed for automated edge scanning, the marking 22 is preferably applied on the lighter of the two core sections, which in this case is the rear core section 18B. This will provide contrast between the marked rear core section 18B and the combination of the front overlay section 8 and the front core section 18A (which is dark). There will also be contrast between the marked rear core section 18B and the rear overlay section 14, thus allowing the edge 9 of the card 2 to be properly edge scanned. Note that the selection of which core section receives the marking 22 is dependent on the relative contrast of those sections with respect to the front and rear overlay sections 8 and 14. In some cases (depending on how the card 2 is manufactured), the front core section 18A will appear lighter than the rear core section 18B, and marking 22 will then be applied to the front core section 18A.

As in the case of the embodiment of FIG. 3A, the marking 22 in FIG. 3B can range in height from the minimum required for edge scanner detection, to the maximum thickness of the rear core section 18B. In the latter case, the marking will be spaced from the card's front surface 6 a distance of "$d_1$" that represents the combined thickness of the front overlay section 8 and the front core section 18A. The marking will be spaced from the card's rear surface 12 a distance of "$d_2$" that represents the thickness of the rear overlay section 14. In a transparent/translucent financial transaction card constructed according to Applicant's co-pending applications, the total card thickness is between about 27–33 mils, the front and rear cores 16A and 16B have substantially equal thickness of about 11.5–15 mils, and the front and rear overlay thickness is between about 1.5–2 mils, respectively. For such cards, there should be a "$d_1$" spacing of at least about 13–17 mils between the marking 22 and the card's front surface 6, and a "$d_2$" spacing of at least about 1.5–2 mils between the marking 22 and the card's rear surface 12. The top-to-bottom height "h" of the marking 22 could range between about 5–15 mils. This translates to an "h" value of between about 33–100% of the total thickness of the rear core 16A.

Figure 4A:
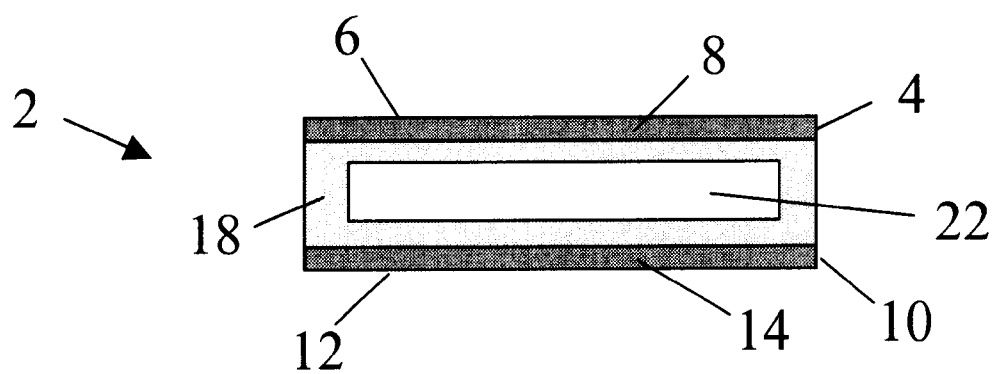
FIG. 4A is an end view taken in the direction of arrows 4—4 in FIG. 2 and showing an edge of the financial transaction card of FIG. 2 with a contrast enhancer provided thereon according to one aspect the invention.
Figure 4B:
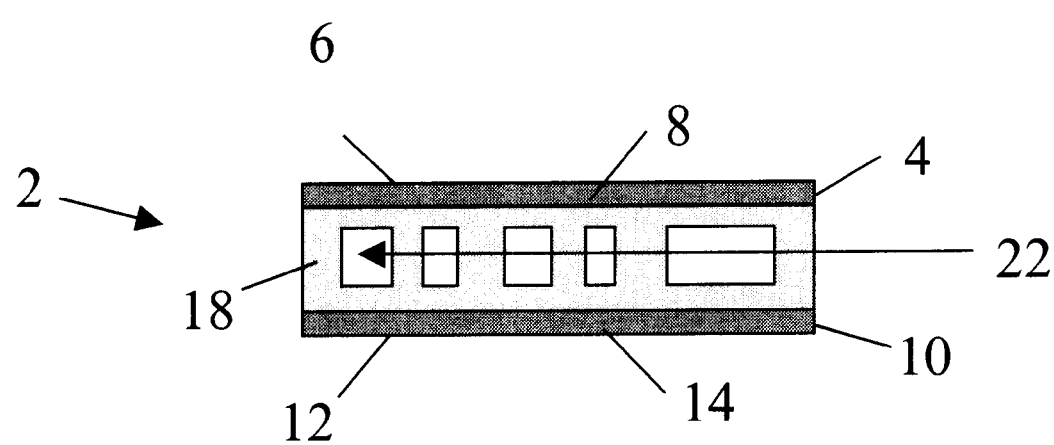
FIG. 4B is an end view taken in the direction of arrows 4—4 in FIG. 2 and showing an edge of the financial transaction card of FIG. 2 with an alternative contrast enhancer provided thereon according to another aspect of the invention.

Turning now to FIG. 4A, it will be seen that the marking 22 can be formed as a line that extends substantially parallel to the front and rear surfaces 6 and 12 of the card 2. Alternatively, as shown in FIG. 4B, the marking 22 could be formed as one or more encoding shapes for imparting information about the card 2 to the processing equipment. By way of example only, the marking 22 could be configured as a bar code.

Although the marking 22 can be applied in a variety of ways, it is preferably made using an ink that is placed on the core section 18 in the appropriate pattern using an ink jet printer. It will be appreciated that many different ink formulations could be used for this purpose, so long as it is compatible with the ink jet printing apparatus being used, and with the card material. By way of example only, the ink used to form the marking 22 may be a solvent-based opaque white material comprising very finely ground pigments or dyes dissolved or suspended in a solvent comprising methanol, ethanol, isopropanol, acetone, methylethyl ketones, or other organic solvent compound.

A commercially available ink jet printing apparatus that may be used for applying the ink is the Domino A300 ink jet printer from Domino Printing Sciences, PLC ("Domino"), of Cambridge, England. The Domino A200 printer could also be used. These printers both employ the usual ink jet print heads that comprise an array of ink jet nozzles (e.g., 7 rows×5 columns) that can be selectively activated to lay down typographic patterns. These printers can be set-up to apply a line of ink (continuous or intermittent) of suitable color to the core section 18 at a desired opacity and line width. Note that opacity and line width are affected by the speed of the card 2 past the print head, the dot pattern used, the size of the print head inkjet nozzles and the distance of the card from the print head. Usually, the latter two parameters, ink jet nozzle size (typically about 60–75 microns) and card-to-print head distance (typically about 1/8 inches) are fixed. This leaves the remaining parameters, card speed and dot pattern, to be adjusted. According Applicant's tests, line patterns that are sufficiently opaque (e.g., opaque white) can be formed by maintaining a card speed of between about 2–20 inches per second. Line widths of between about 10–20 mils can be formed by using a print dot pattern corresponding to a typographic line, as follows: "_____".

Accordingly, a method and a product of such method have been described wherein improvement is made in the readability of a financial transaction card having poor edge contrast by an automated card processing system equipped with a card edge scanner. While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for improving the readability of a transparent or translucent financial transaction card having poor edge contrast by an automated card processing system equipped with a card edge scanner, comprising the steps of:
   selecting an edge of the card to be scanned by the edge scanner;
   identifying on said selected edge a core section, a front overlay section, and a rear overlay section;
   providing said core section with a contrast enhancer, said contrast enhancer enhancing a contrast of said core section relative to said front overlay section and said rear overlay section to render said card processable by the card processing system; and
   said contrast enhancer being provided so as not to reduce the transparency or translucency of said card.

2. A method in accordance with claim 1, wherein said contrast enhancer is light relative to said front overlay section and said rear overlay section.

3. A method in accordance with claim 2, wherein said contrast enhancer is white.

4. A method in accordance with claim 1, wherein said contrast enhancer comprises a marking formed on said core section.

5. A method in accordance with claim 4, wherein said core section has a total thickness of between about 23–30 mils and said marking has a top-to-bottom height within a range of about 5–30 mils.

6. A method in accordance with claim 4, wherein said marking has a top-to-bottom height within a range of about 17%–100% of the thickness of said core section.

7. A method in accordance with claim 4, wherein said card has two core sheets and said core section comprises first and second core sections, said first core section having less contrast relative to said front and rear overlay sections than said second core section, and wherein said marking is applied to said second core section.

8. A method in accordance with claim 7, wherein said first and second core sections each have a thickness of between about 11.5–15 mils and said marking has a top-to-bottom height of about 5–15 mils.

9. A method in accordance with claim 7, wherein said marking has a top-to-bottom height within a range of about 33%–100% of the thickness of said second core section.

10. A method in accordance with claim 4, wherein said marking is a line.

11. A method in accordance with claim 4, wherein said marking is formed as one or more encoding shapes for imparting information about said card.

12. A method in accordance with claim 4, wherein said marking is located approximately equidistantly between said front overlay section and said rear overlay section.

13. A method in accordance with claim 4, wherein said core section comprises a single core layer and said marking is formed by an ink.

14. A method in accordance with claim 4, wherein said marking is formed by an opaque white material.

15. A method in accordance with claim 4, wherein said marking is formed by an ink applied via ink jet printing.

16. A method in accordance with claim 15, wherein ink jet printing is performed using a card speed and ink jet pattern selected to produce a desired opacity and marking width.

17. A transparent or translucent financial transaction card having improved readability by an automated card processing system equipped with a card edge scanner, comprising:
- a front overlay portion defining a generally planar front surface of said card and having a continuous periphery that includes a front overlay section of a scannable edge of said card;
- a rear overlay portion defining a generally planar rear surface of said card and having a continuous periphery includes a rear overlay section of said scannable edge of said card;
- a core having one or more transparent or translucent sheets disposed between said front overlay portion and said rear overlay portion and having a continuous periphery that includes a core section of said scannable edge of said card;
- a contrast enhancer located on said core section, said contrast enhancer enhancing a contrast of said core section relive to said front overlay section and said rear overlay section to render said card processable by the card processing system; and
- said contrast enhancer being adapted so as not to reduce the transparency or translucency of said card.

18. A financial transaction card in accordance with claim 17, wherein said contrast enhancer is light relative to said front overlay section and said rear overlay section.

19. A financial transaction card in accordance with claim 18, wherein said contrast enhancer is white.

20. A financial transaction card in accordance with claim 17, wherein said contrast enhancer comprises a marking formed on said core section.

21. A financial transaction card in accordance with claim 20, wherein said core section has a total thickness of between about 23–30 mils and said marking has a top-to-bottom height within a range of about 5–30 mils.

22. A financial transaction card in accordance with claim 20, wherein said marking has a top-to-bottom height within a range of about 17%–100% of the thickness of said core section.

23. A financial transaction card in accordance with claim 20, wherein said card has two core sheets and said core section comprises first and second core sections, said first core section having less contrast relative to said front and rear overlay sections than said second core section, and wherein said marking is applied to said second core section.

24. A financial transaction card in accordance with claim 23, wherein said first and second core sections each have a thickness of between about 11.5–15 mils and said marking has a top-to-bottom height of about 5–15 mils.

25. A financial transaction card in accordance with claim 23, wherein said marking has a top-to-bottom height within a range of about 33%–100% of the thickness of said second core section.

26. A financial transaction card in accordance with claim 20, wherein said marking is a line.

27. A financial transaction card in accordance with claim 20, wherein said marking is formed as one or more encoding shapes for imparting information about said card.

28. A financial transaction card in accordance with claim 20 wherein said marking is formed approximately equidistantly between said upper surface and said lower surface.

29. A financial transaction card in accordance with claim 20 wherein said marking is formed closer to one of said front or rear surface than to the other.

30. A financial transaction in accordance with claim 20, wherein said marking is formed by an ink.

31. A financial transaction card in accordance with claim 20, wherein said marking is formed by an opaque white material.

* * * * *